(12) United States Patent
Kim et al.

(10) Patent No.: US 9,297,513 B2
(45) Date of Patent: Mar. 29, 2016

(54) DISPLAY APPARATUS HAVING ILLUMINATION UNIT WITH SPECIFIC BRACKET

(71) Applicant: LG INNOTEK CO., LTD., Seoul (KR)

(72) Inventors: Moon Jeong Kim, Seoul (KR); Duk Hyun Yun, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 528 days.

(21) Appl. No.: 13/711,109

(22) Filed: Dec. 11, 2012

(65) Prior Publication Data
US 2013/0148331 A1 Jun. 13, 2013

(30) Foreign Application Priority Data
Dec. 12, 2011 (KR) .................. 10-2011-0132884

(51) Int. Cl.
| | |
|---|---|
| *F21V 7/00* | (2006.01) |
| *G09F 13/14* | (2006.01) |
| *F21S 8/02* | (2006.01) |
| *F21V 15/01* | (2006.01) |
| *G02F 1/1333* | (2006.01) |
| *G02F 1/1335* | (2006.01) |
| *F21V 8/00* | (2006.01) |
| *F21Y 103/00* | (2006.01) |

(52) U.S. Cl.
CPC ... *F21V 7/00* (2013.01); *F21S 8/02* (2013.01); *F21V 15/01* (2013.01); *G02B 6/0096* (2013.01); *G02F 1/133308* (2013.01); *G02F 1/133608* (2013.01); *G02F 1/133615* (2013.01); *G09F 13/14* (2013.01); *F21Y 2103/003* (2013.01); *G02B 6/0046* (2013.01); *G02B 6/0081* (2013.01); *G02F 2001/133317* (2013.01)

(58) Field of Classification Search
CPC ......... F21V 17/00; F21V 17/04; F21V 17/06; F21V 17/101; F21V 17/104; F21V 17/12; F21V 19/003; F21V 19/0035; F21V 19/005; F21V 19/0055; G02F 1/133308; G02F 2001/133314; G02F 2001/133328; G02F 2001/133603; G02F 1/133608
See application file for complete search history.

(56) References Cited

U.S. PATENT DOCUMENTS

| | | | |
|---|---|---|---|
| 6,927,812 B2 * | 8/2005 | Cho | 349/65 |
| 7,600,908 B2 * | 10/2009 | Chang et al. | 362/623 |
| 8,534,858 B2 * | 9/2013 | Lee et al. | 349/58 |
| 2001/0050731 A1 * | 12/2001 | An et al. | 349/58 |
| 2006/0092344 A1 * | 5/2006 | Ura et al. | 349/58 |
| 2006/0221610 A1 * | 10/2006 | Chew et al. | 362/247 |
| 2006/0262079 A1 * | 11/2006 | Seong et al. | 345/102 |

(Continued)

FOREIGN PATENT DOCUMENTS

| | | |
|---|---|---|
| CN | 201196378 Y | 2/2009 |
| CN | 101770112 A | 7/2010 |

(Continued)

*Primary Examiner* — Ismael Negron

(74) *Attorney, Agent, or Firm* — Birch, Stewart, Kolasch & Birch, LLP

(57) ABSTRACT

A display apparatus with an illumination unit has first and second reflectors, at least one light source module placed between the first and second reflectors, and a bracket configured to support the light source module. The bracket includes a body configured to connect one side of the first reflector to one side of the second reflector, a first fastening member protruding from an inner surface of the body, and a second fastening member protruding from an outer surface of the body.

20 Claims, 20 Drawing Sheets

(56) References Cited

U.S. PATENT DOCUMENTS

2007/0171676 A1* 7/2007 Chang ............................ 362/613
2010/0165232 A1 7/2010 Park et al.
2011/0211335 A1* 9/2011 Ko ................................ 362/97.1

FOREIGN PATENT DOCUMENTS

| DE | 101 28 689 A1 | | 7/2002 |
|---|---|---|---|
| DE | 20 2011 051 236 U1 | | 11/2011 |
| WO | WO 2012014601 A1 | * | 2/2012 |
| WO | WO 2012023321 A1 | * | 2/2012 |

* cited by examiner

DISPLAY APPARATUS HAVING ILLUMINATION UNIT WITH SPECIFIC BRACKET

CROSS REFERENCE TO RELATED APPLICATION

This application claims priority under 35 U.S.C. §119 to Korean Patent Application No. 10-2011-0132884, filed in Korea on 12 Dec. 2011, which is hereby incorporated in its entirety by reference as if fully set forth herein.

TECHNICAL FIELD

Embodiments relate to an illumination unit and a display apparatus using the same.

BACKGROUND

In general, downlights are constructed such that a light source is embedded in a ceiling hole. Such downlights have been widely used as architectural illumination means that integrate illumination with a building.

The downlight is embedded in the ceiling so as to be substantially prevented from being exposed outward, thus advantageously providing an orderly external appearance to the ceiling. Moreover, the downlight embedded in the ceiling may have low luminance and be suitable to form an intimate indoor space.

However, such an illumination unit configuration may be suitable for a narrow indoor space than a wide indoor space, and may need a great number of light sources such as Light Emitting Diodes (LEDs).

Accordingly, in the future, development of an illumination unit suitable for a wide indoor space even with a low number of LEDs is necessary.

SUMMARY

Embodiments provide an illumination unit which includes a reflector partially provided with an inclined surface and is suitable for a wide indoor space, and a display apparatus using the same.

In one embodiment, an illumination unit includes first and second reflectors, at least one light source module placed between the first and second reflectors, and a bracket configured to support the light source module, wherein the bracket includes a body configured to connect one side of the first reflector to one side of the second reflector, a first fastening member protruding from an inner surface of the body, and a second fastening member protruding from an outer surface of the body.

The body of the bracket may be arranged orthogonal to the first reflector.

The body of the bracket may include a first segment configured to come into contact with the light source module, and a second segment configured to come into contact with one side of the second reflector.

The first segment and the second segment of the body may be deviated from each other.

The first segment of the body may have a first length, the second segment of the body may have a second length, and the second length may be greater than the first length.

The second length may be 1.1~10 times the first length.

The second fastening member may be placed between the first and second segments of the body, and at least one fastening hole may be located in the second segment of the body.

The first fastening member may protrude orthogonally from the inner surface of the body toward the second reflector.

The first fastening member may include a plurality of protrusions spaced apart from one another by a predetermined distance, and a height of one of the protrusions close to the light source module may be less than a height of one of the protrusions distant from the light source module.

A highest height of the protrusions may be 1.1~10 times a lowest height of the protrusions.

Any one of the plurality of protrusions may be arranged opposite to the second fastening member.

At least one fastening hole may be located between the protrusions next to each other.

The second fastening member may protrude orthogonally from the outer surface of the body in an opposite direction of the second reflector.

The second fastening member may have at least one fastening hole.

One surface of the second fastening member may come into contact with a cover member, and the cover member may be spaced apart from the first reflector and be configured to cover the first reflector.

An optical member may be located between the cover member and the first reflector.

A length of the cover member may be greater than a total length of the first reflector and the second fastening member, and a length of the second fastening member may be greater than a length of the first reflector.

The bracket and the first reflector may be formed of the same material.

The second reflector may include first and second inclined surfaces next to each other, and the first inclined surface close to the light source module may be inclined upward, and the second inclined surface next to the first inclined surface may be inclined downward.

The first inclined surface may be a curved surface having a first radius of curvature, the second inclined surface may be a curved surface having a second radius of curvature, and the first radius of curvature and the second radius of curvature may differ from each other.

The first inclined surface may be a flat surface having a first gradient, the second inclined surface may be a flat surface having a second gradient, and the first gradient and the second gradient may differ from each other.

BRIEF DESCRIPTION OF THE DRAWINGS

Arrangements and embodiments may be described in detail with reference to the following drawings in which like reference numerals refer to like elements and wherein.

DESCRIPTION OF SPECIFIC EMBODIMENTS

Hereinafter, embodiments will be described with reference to the annexed drawings.

It will be understood that when an element is referred to as being 'on' or "under" another element, it can be directly on/under the element, and one or more intervening elements may also be present.

Also, when an element is referred to as being 'on' or 'under', 'under the element' as well as 'on the element' can be included based on the element.

Figure 1:
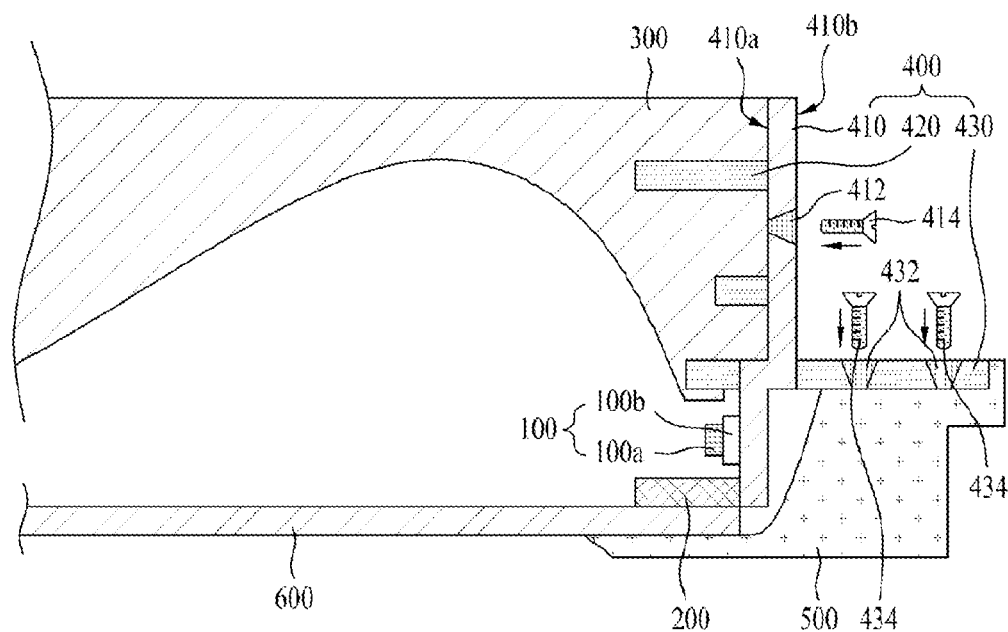
FIG. 1 is an explanatory sectional view illustrating an illumination unit according to an embodiment.

FIG. 1 is an explanatory sectional view illustrating an illumination unit according to an embodiment.

As illustrated in FIG. 1, the illumination unit may include a light source module 100, a first reflector 200, a second reflector 300, a bracket 400, a cover member 500, and an optical member 600.

The bracket 400 may serve to support the light source module 100. The bracket 400 may include a body 410, and first and second fastening members 420 and 430.

One side of the first reflector 200 may be connected to one side of the second reflector 300 by the body 410 of the bracket 400. The first fastening member 420 may protrude from an inner surface 410a of the body 410, and the second fastening member 430 may protrude from an outer surface 410b of the body 410.

The body 410 of the bracket 400 may be aligned in a direction orthogonal to the first reflector 200. The body 410 may consist of a first segment that comes into contact with the light source module 100 and a second segment that comes into contact with one side of the second reflector 300.

The first fastening member 420 may protrude orthogonally from the inner surface 410a of the body 410 toward the second reflector 300. The first fastening member 420 may include a plurality of protrusions spaced apart from one another by a predetermined distance. A height of one of the protrusions close to the light source module 100 may be less than a height of one of the protrusions distant from the light source module 100.

Here, a highest height of the protrusions may be 1.1~10 times a lowest height of the protrusions.

Any one of the plurality of protrusions may be located opposite to the second fastening member 430.

At least one first fastening hole 412 may be formed between the protrusions next to each other.

As a first fastening screw 414 is inserted from the outside of the body 410 through the first fastening hole 412, the second reflector 300 and the bracket 400 may be fastened to each other.

The second fastening member 430 may protrude orthogonally from the outer surface 410b of the body 410 in an opposite direction of the second reflector 300.

The second fastening member 430 may have at least one second fastening hole 432.

As a second fastening screw 434 is inserted from the outside of the body 410 through the second fastening hole 432, the cover member 500 and the bracket 400 may be fastened to each other.

The cover member 500 may come into contact with one surface of the second fastening member 430, and may be spaced apart from the first reflector 200 to cover the first reflector 200.

The optical member 600 may be located between the cover member 500 and the first reflector 200.

Here, a length of the cover member 500 may be greater than a total length of the first reflector 200 and the second fastening member 430, and a length of the second fastening member 430 may be greater than a length of the first reflector 200.

The bracket 400 and the first reflector 200 may be formed of the same material. For example, the bracket 400 and the first reflector 200 may be formed of a metal or metal oxide.

As occasion demands, the bracket 400 and the first reflector 200 may be formed of different materials. For example, the bracket 400 may be formed of a metal or metal oxide, whereas the first reflector 200 may be formed by depositing or coating a metal or metal oxide on a polymer resin frame.

The first reflector 200 may be formed of a metal or metal oxide having high reflectivity, such as aluminum (Al), silver (Ag), gold (Au) or titanium dioxide ($TiO_2$).

As occasion demands, the first reflector 200 may be formed by attaching a reflective film or reflective sheet to a polymer resin frame.

Alternatively, the first reflector 200 may be formed by printing metallic ink on a polymer resin frame, instead of depositing or coating a metal or metal oxide on the polymer resin frame.

A saw-toothed reflective pattern may be formed on a portion of a lower surface of the first reflector 200.

The reflective pattern may be flat or may be curved.

The light source module 100 may be located between the first reflector 200 and the second reflector 300 and may be located closer to the first reflector 200 than the second reflector 300.

As occasion demands, the light source module 100 may come into contact with the first reflector 200 while being spaced apart from the second reflector 300 by a predetermined distance, or may come into contact with the second reflector 300 while being spaced apart from the first reflector 200 by a predetermined distance.

Alternatively, the light source module 100 may be spaced apart from the first reflector 200 and the second reflector 300 by predetermined distances, or may come into contact with both the first reflector 200 and the second reflector 300.

The light source module 100 may include a board 100b having an electrode pattern, and at least one light source 100a placed on the board 100b.

The light source 100a of the light source module 100 may be a top view type light emitting diode.

As occasion demands, the light source 100a may be a side view type light emitting diode.

The board 100b may be a Printed Circuit Board (PCB) formed of any one material selected from among polyethyleneterephthalate (PET), glass, polycarbondate (PC), and silicon (Si), and may take the form of a film.

A single layer PCB, a multilayer PCB, a ceramic board, a metal core PCB, or the like may be selectively used as the board 100b.

The board 100b may be provided with any one of a reflective coating film and a reflective coating material layer, to reflect light emitted from the light source 100a to a central region of the reflector 300.

The light source 100a may be a Light Emitting Diode (LED) chip. The LED chip may be a blue LED chip or an ultraviolet LED chip, or may be a package combining at least one or more selected from among a red LED chip, a green LED chip, a blue LED chip, a yellow green LED chip, and a white LED chip.

A white LED may be realized by coupling a yellow phosphor to a blue LED, by coupling both red and green phosphors to a blue LED, or by coupling yellow, red and green phosphors to a blue LED.

The second reflector 300 may partially be provided with an inclined surface, and may be formed of a metal or metal oxide having high reflectivity, such as aluminum (Al), silver (Ag), gold (Au) or titanium dioxide ($TiO_2$).

The inclined surface of the second reflector 300 may be aligned with at least one of the light source module 100 and the first reflector 200.

The inclined surface of the second reflector 300 may have a predetermined inclination angle with respect to a surface of the first reflector 200. The inclined surface may be at least one of a concave surface, a convex surface and a flat surface.

As occasion demands, the second reflector 300 may include at least one inclined surface and at least one flat surface. The flat surface of the second reflector 300 may be parallel to a flat surface of the first reflector 200.

The flat surface of the second reflector 300 may be aligned with at least one of the light source module 100 and the first reflector 200.

The second reflector 300 may include at least two inclined surfaces having at least one inflection point. That is, first and second inclined surfaces, which are next to each other about the inflection point, may have different radii of curvature.

For example, as illustrated in FIG. 1, an upper surface of the second reflector 300 facing the first reflector 200 may include a flat surface and an inclined surface.

The flat surface may be located close to the light source module 100 and may be parallel to the first reflector 200.

The inclined surface may extend from a distal end of the flat surface and may be inclined toward a lower surface of the second reflector 300.

The optical member 600 may be spaced apart from the second reflector 300 by a predetermined distance.

As such, an air guide may be defined in a space between the second reflector 300 and the optical member 600.

As occasion demands, the optical member 600 may be formed of at least one sheet. More specifically, the optical member 600 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

Figure 2:
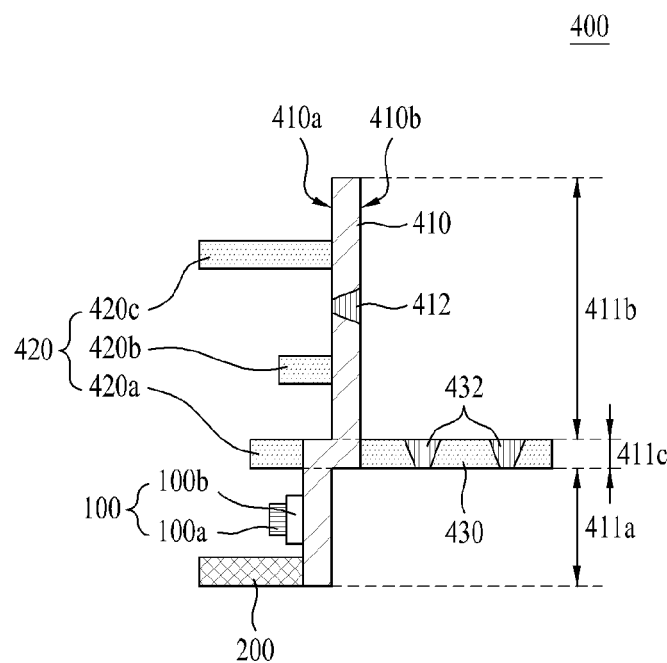
FIG. 2 is a sectional view illustrating a bracket of FIG. 1 in detail.

FIG. 2 is a sectional view illustrating the bracket of FIG. 1 in detail.

As illustrated in FIG. 2, the bracket 400 may include the body 410, the first fastening member 420, and the second fastening member 430.

The body 410 of the bracket 400 may be connected to one side of the first reflector 200, and may extend in a direction orthogonal to the first reflector 200.

The body 410 of the bracket 400 may consist of a first segment 411a that comes into contact with the light source module 100, a second segment 411b that comes into contact with one side of the second reflector 300, and a connecting portion 411c that connects the first segment 411a and the second segment 411b to each other.

In this case, the first segment 411a and the second segment 411b of the body 410 may be deviated from each other.

This serves to assist the bracket 400 in coming into close contact with the second reflector 300, thereby facilitating fastening between the bracket 400 and the second reflector 300.

The first segment 411a of the body 410 may have a first length and the second segment 411b of the body 410 may have a second length. The second length may be greater than the first length.

The first fastening member 420 may protrude from the inner surface 410a of the body 410.

More specifically, the first fastening member 420 may protrude orthogonally from the inner surface 410a of the body 410 toward the second reflector 300.

The first fastening member 420 may include a plurality of protrusions spaced apart from one another by a predetermined distance. A height of one of the protrusions close to the light source module 100 may be less than a height of one of the protrusions distant from the light source module 100.

For example, assuming that the first fastening member 420 includes first, second and third protrusions 420a, 420b and 420c, a height of the first protrusion 420a close to the light source module 100 may be less than a height of the third protrusion 420c distant from the light source module 100.

Any one of the plurality of protrusions may be located opposite to the second fastening member 430. For example, among the first, second and third protrusions 420a, 420b and 420c, the first protrusion 420a may be located opposite to the second fastening member 430.

At least one fastening hole may be formed between the protrusions next to each other. For example, the first fastening hole 412 may be formed between the second and third protrusions 420b and 420c next to each other.

That is, at least one first fastening hole 412 may be formed in the second segment 411b of the body 410.

The second fastening member 430 may protrude from the outer surface 410b of the body 410.

More specifically, the second fastening member 430 may be located at the connecting portion 411c between the first and second segments 411a and 411b of the body 410.

As occasion demands, the second fastening member 430 may be located at the first segment 411a or the second segment 411b of the body 410.

As described above, the second fastening member 430 may protrude orthogonally from the outer surface 410b of the body 410 in an opposite direction of the second reflector 300, and may have the at least one second fastening hole 432.

Figure 3A:
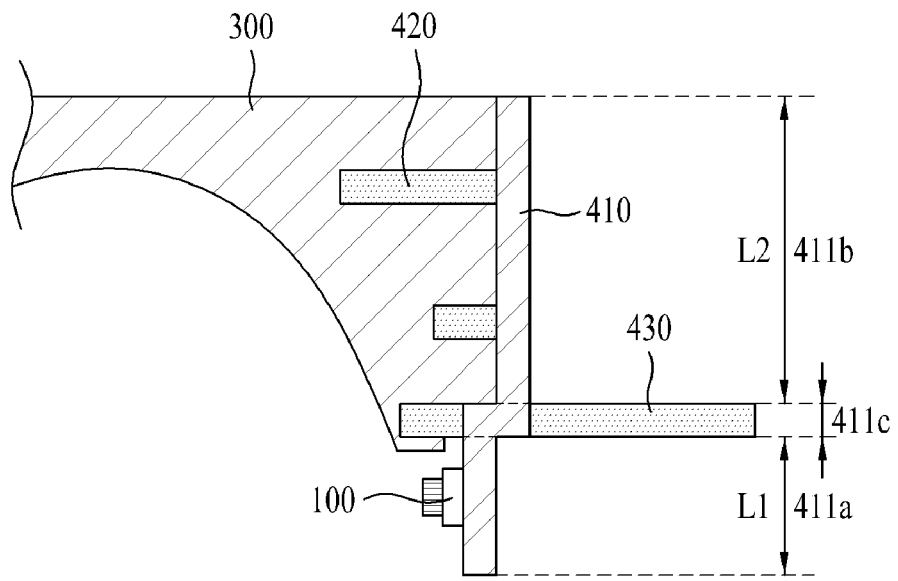
FIGS. 3A and 3B are sectional views illustrating a body of the bracket.
Figure 3B:
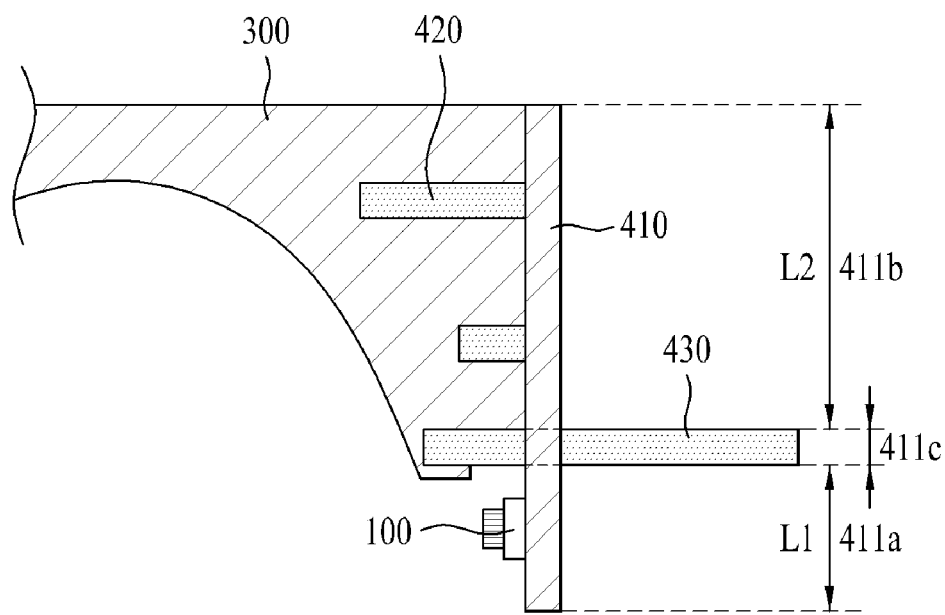

FIGS. 3A and 3B are sectional views illustrating the body of the bracket.

As illustrated in FIGS. 3A and 3B, the bracket 400 may include the body 410, the first fastening member 420 and the second fastening member 430.

The body 410 of the bracket 400 may consist of the first segment 411a that comes into contact with the light source module 100, the second segment 411b that comes into contact with one side of the second reflector 300, and the connecting portion 411c that connects the first segment 411a and the second segment 411b to each other.

As illustrated in FIG. 3A, the first segment 411a and the second segment 411b of the body 410 may be deviated from each other.

This serves to assist the bracket 400 in coming into close contact with the second reflector 300, thereby facilitating fastening between the bracket 400 and the second reflector 300.

The first segment 411a of the body 410 may have a first length L1, and the second segment 411b of the body 410 may have a second length L2. The second length L2 may be greater than the first length L1.

Here, the second length L2 may be about 1.1~10 times the first length L1.

This serves to appropriately adjust a thickness of the illumination unit because if the first length L1 of the first segment 411a is greater than the second length L2 of the second segment 411b, a thickness of the entire illumination unit may excessively increase, thus causing deterioration in luminance.

As occasion demands, as illustrated in FIG. 3B, the first segment 411a and the second segment 411b of the body 410 may be located on the same line.

The first segment 411a and the second segment 411b of the body 410 may be deviated from each other or may be located opposite to each other according to the shape of the entire illumination unit.

Figure 4A:
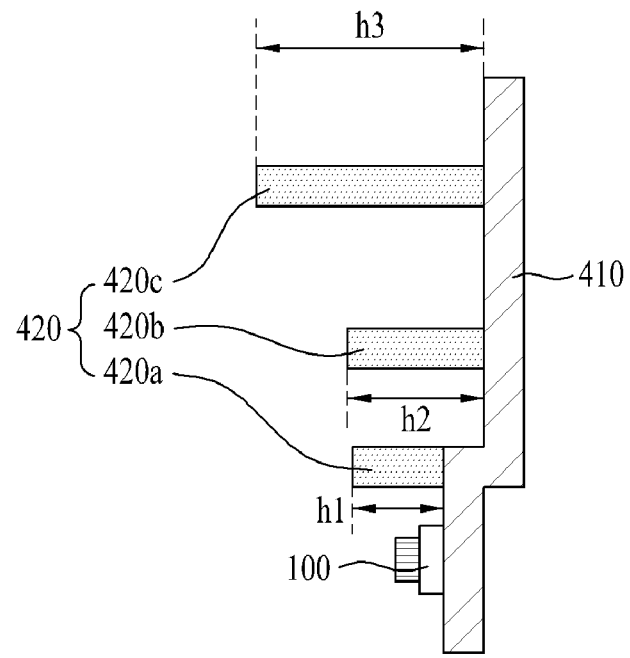
FIGS. 4A to 4C are sectional views illustrating a height of a first fastening member of the bracket.
Figure 4B:
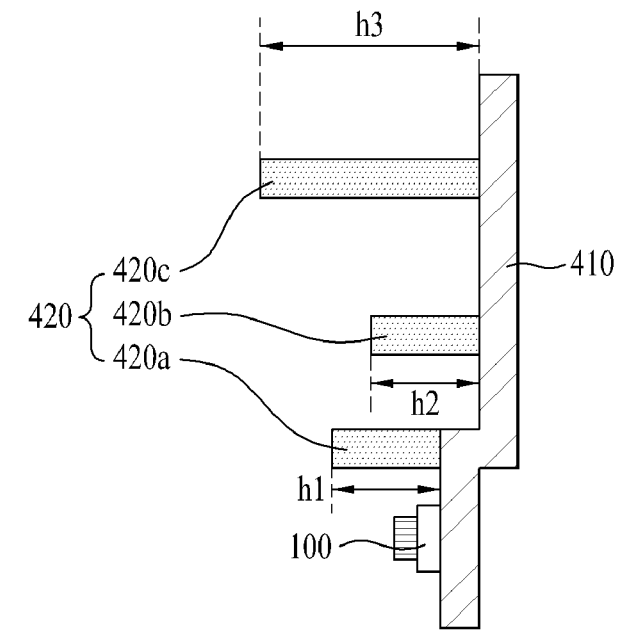
Figure 4C:
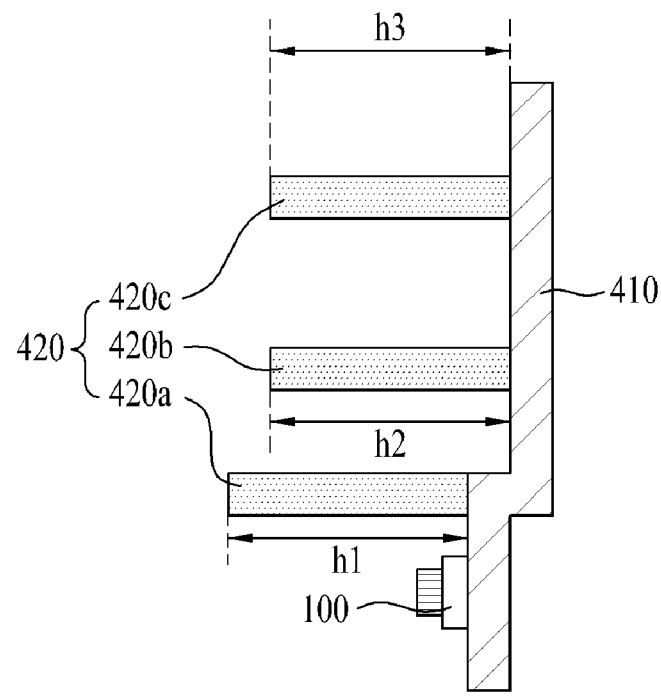

FIGS. 4A to 4C are sectional views illustrating a height of the first fastening member of the bracket.

As illustrated in FIGS. 4A to 4C, the first fastening member 420 may protrude orthogonally from the inner surface of the body 410 toward the second reflector.

The first fastening member 420 may include a plurality of protrusions spaced apart from one another by a predetermined distance. A height of one of the protrusions close to the light source module 100 may be less than a height of one of the protrusions distant from the light source module 100.

For example, the first fastening member 420 may include the first, second and third protrusions 420a, 420b and 420c. The first protrusion 420a may protrude by a first height h1, the second protrusion 420b may protrude by a second height h2, and the third protrusion 420c may protrude by a third height h3.

The first protrusion 420a may be located close to the light source module 100, and the third protrusion 420c may be located distant from the light source module 100.

As illustrated in FIG. 4A, the height h1 of the first protrusion 420a located close to the light source module 100 may be less than the height h3 of the third protrusion 420c located distant from the light source module 100, and may be less than the height h2 of the second protrusion 420b located between the first protrusion 420a and the third protrusion 420c.

The height h3 of the third protrusion 420c may be about 1.1~10 times the height h1 of the first protrusion 420a.

That is, in the first fastening member 420, a highest height of the protrusions may be about 1.1~10 times a lowest height of the protrusions.

The reason for providing the third protrusion 420c with the height h3 greater than the height h1 of the first protrusion 420a is to ensure stable fastening between the bracket 400 and the second reflector.

As occasion demands, as illustrated in FIG. 4B, the height h1 of the first protrusion 420a located close to the light source module 100 may be less than the height h3 of the third protrusion 420c located distant from the light source module 100, and may be equal to the height h2 of the second protrusion 420b located between the first protrusion 420a and the third protrusion 420c.

As illustrated in FIG. 4C, the height h1 of the first protrusion 420a located close to the light source module 100, the height h3 of the third protrusion 420c located distant from the light source module 100, and the height h2 of the second protrusion 420b located between the first protrusion 420a and the third protrusion 420c may be equal to one another.

Figure 5A:
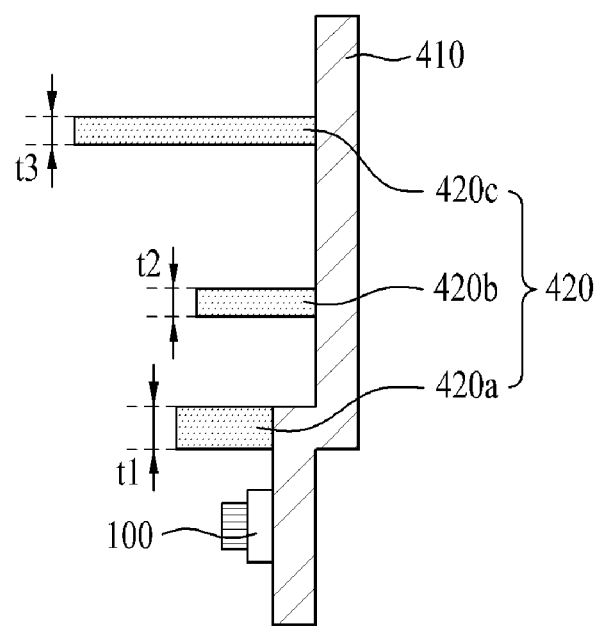
FIGS. 5A to 5C are sectional views illustrating a thickness of the first fastening member of the bracket.
Figure 5B:
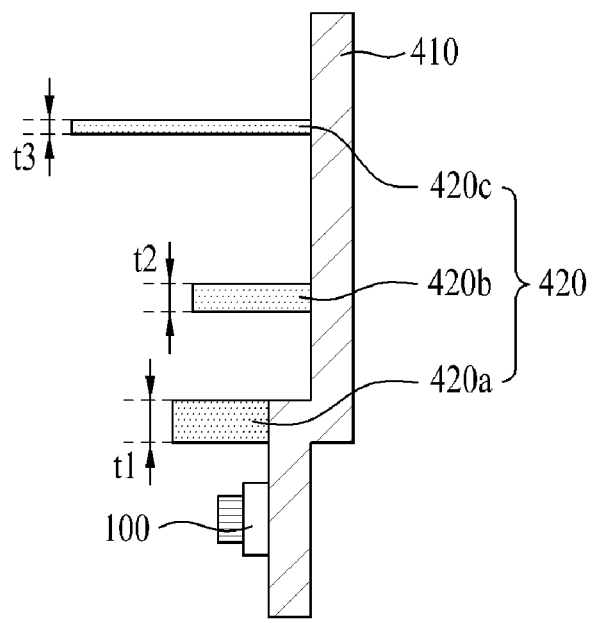
Figure 5C:
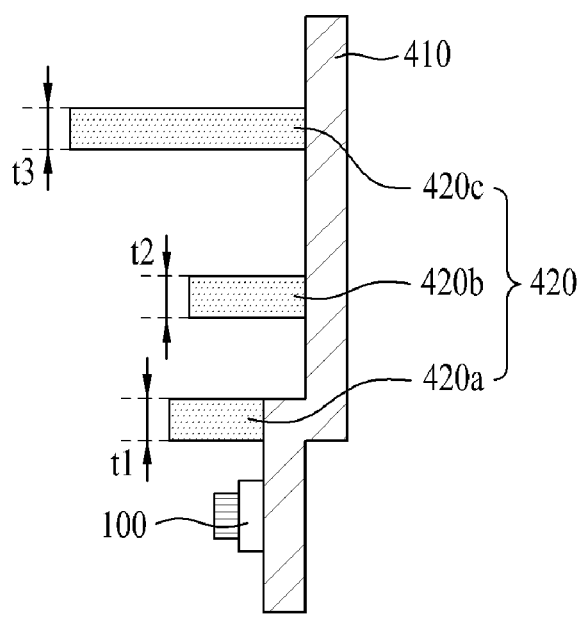

FIGS. 5A to 5C are sectional views illustrating a thickness of the first fastening member of the bracket.

As illustrated in FIGS. 5A to 5C, the first fastening member 420 may protrude orthogonally from the inner surface of the body 410 toward the second reflector.

The first fastening member 420 may include a plurality of protrusions spaced apart from one another by a predetermined distance. A thickness of one of the protrusions close to the light source module 100 may be greater than a thickness of one of the protrusions distant from the light source module 100.

For example, the first fastening member 420 may include the first, second and third protrusions 420a, 420b and 420c. The first protrusion 420a may have a first thickness t1, the second protrusion 420b may have a second thickness t2, and the third protrusion 420c may have a third thickness t3.

The first protrusion 420a may be located close to the light source module 100, and the third protrusion 420c may be located distant from the light source module 100.

As illustrated in FIG. 5A, the thickness t1 of the first protrusion 420a located close to the light source module 100 may be greater than the thickness t3 of the third protrusion 420c located distant from the light source module 100, and may be greater than the thickness t2 of the second protrusion 420b located between the first protrusion 420a and the third protrusion 420c.

The thickness t3 of the third protrusion 420c may be equal to the thickness t2 of the second protrusion 420b.

The reason for providing the first protrusion 420a with the thickness t1 greater than the thickness t3 of the third protrusion 420c is to assist the first protrusion 420a in stably supporting a distal end of the second reflector.

As occasion demands, as illustrated in FIG. 5B, the thickness t1 of the first protrusion 420a located close to the light source module 100 may be greater than the thickness t3 of the third protrusion 420c located distant from the light source module 100, and may be greater than the thickness t2 of the second protrusion 420b located between the first protrusion 420a and the third protrusion 420c.

The thickness t3 of the third protrusion 420c may be less than the thickness t2 of the second protrusion 420b.

As illustrated in FIG. 5C, the thickness t1 of the first protrusion 420a located close to the light source module 100, the thickness t3 of the third protrusion 420c located distant from the light source module 100, and the thickness t2 of the second protrusion 420b located between the first protrusion 420a and the third protrusion 420c may be equal to one another.

Figure 6A:
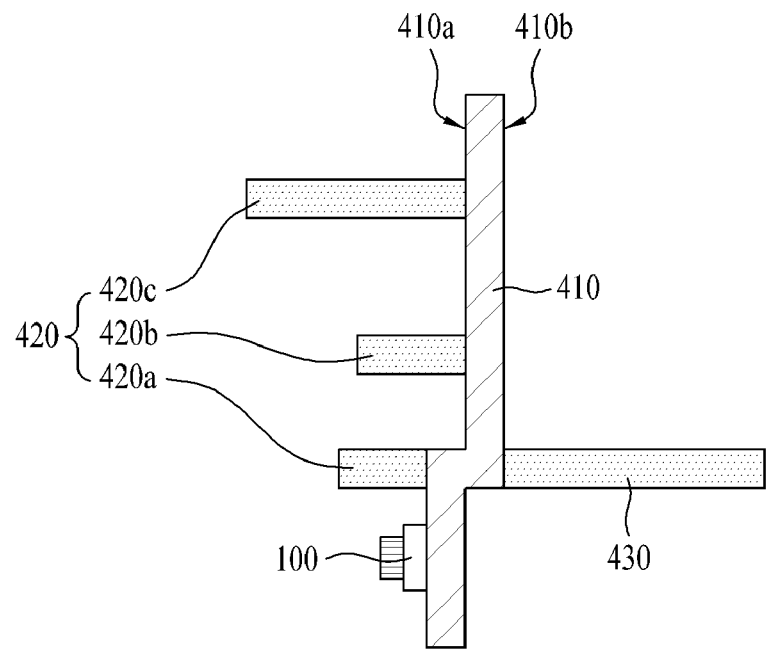
FIGS. 6A to 6C are sectional views illustrating a position of a second fastening member of the bracket.
Figure 6B:
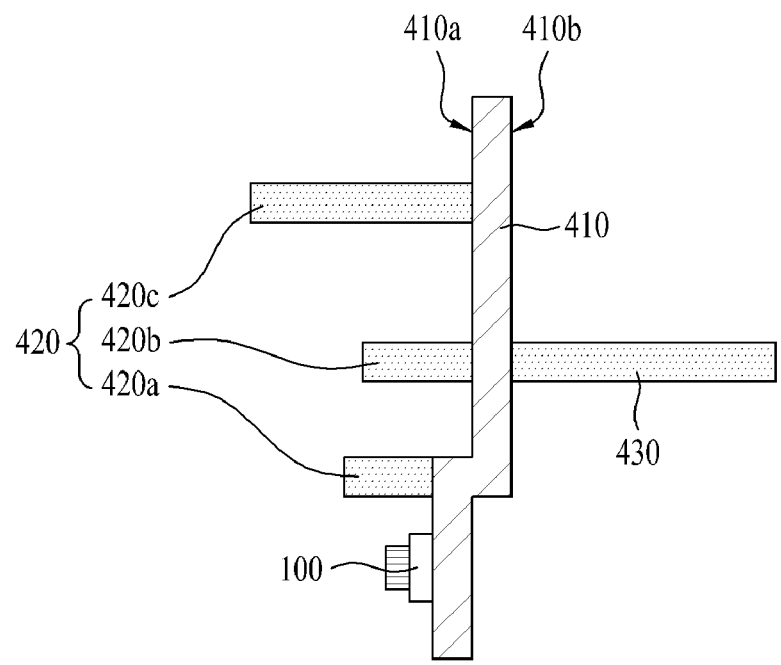
Figure 6C:
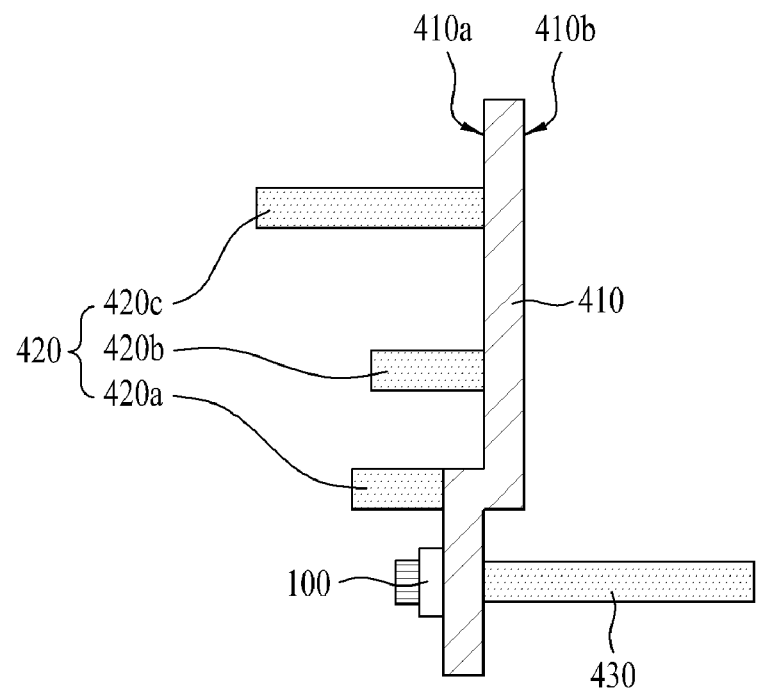

FIGS. 6A to 6C are sectional views illustrating a position of the second fastening member of the bracket.

As illustrated in FIGS. 6A to 6C, the first fastening member 420 may protrude orthogonally from the inner surface of the body 410 toward the second reflector.

The first fastening member 420 may include the first, second and third protrusions 420a, 420b and 420c. The first protrusion 420a may be located close to the light source module 100, and the third protrusion 420c may be located distant from the light source module 100.

The second fastening member 430 may protrude orthogonally from the outer surface of the body 410 in an opposite direction of the second reflector.

The second fastening member 430, as illustrated in FIG. 6A, may be located opposite to the first protrusion 420a of the first fastening member 420.

As occasion demands, as illustrated in FIG. 6B, the second fastening member 430 may be located opposite to the second protrusion 420b of the first fastening member 420.

This arrangement may ensure stable fastening between the second fastening member 430 and the cover member.

As illustrated in FIG. 6C, the second fastening member 430 may be located opposite to the light source module 100.

This arrangement may ensure efficient radiation of heat from the light source module 100.

That is, the second fastening member 430 may also serve as a radiator.

Figure 7:
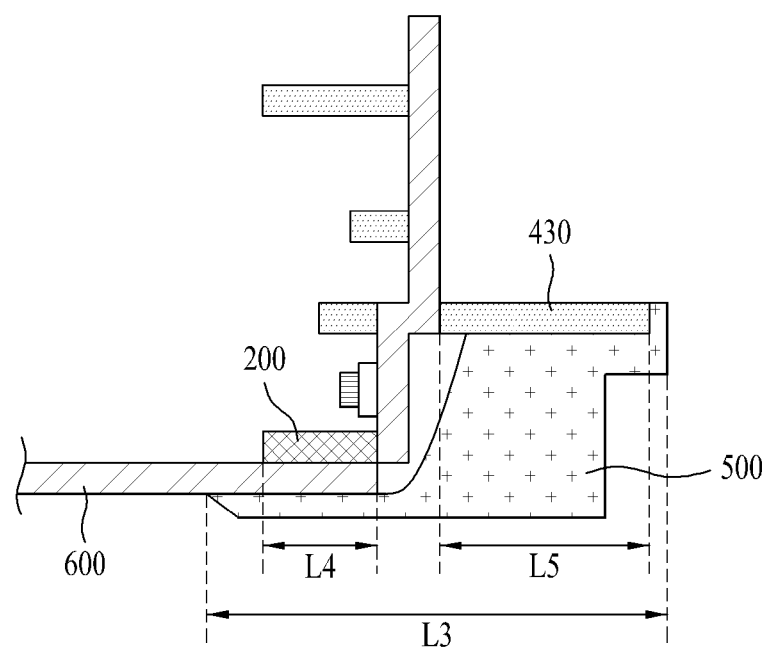
FIG. 7 is a sectional view illustrating a cover member.

FIG. 7 is a sectional view illustrating a cover member.

As illustrated in FIG. 7, the cover member 500 may come into contact with one surface of the second fastening member 430 of the bracket.

The second fastening member 430 may have at least one fastening hole. As a fastening screw is inserted through the fastening hole, the second fastening member 430 of the bracket may be fastened to the cover member 500.

The cover member 500 may be spaced apart from the first reflector 200 and may be configured to cover the first reflector 200.

The optical member 600 may be placed between the cover member 500 and the first reflector 200.

A length L3 of the cover member 500 may be greater than the sum of a length L4 of the first reflector 200 and a length L5 of the second fastening member 430.

The length L5 of the second fastening member 430 may be greater than the length L4 of the first reflector 200.

This serves to ensure stable fastening between the second fastening member 430 of the bracket and the cover member 500.

Figure 8:
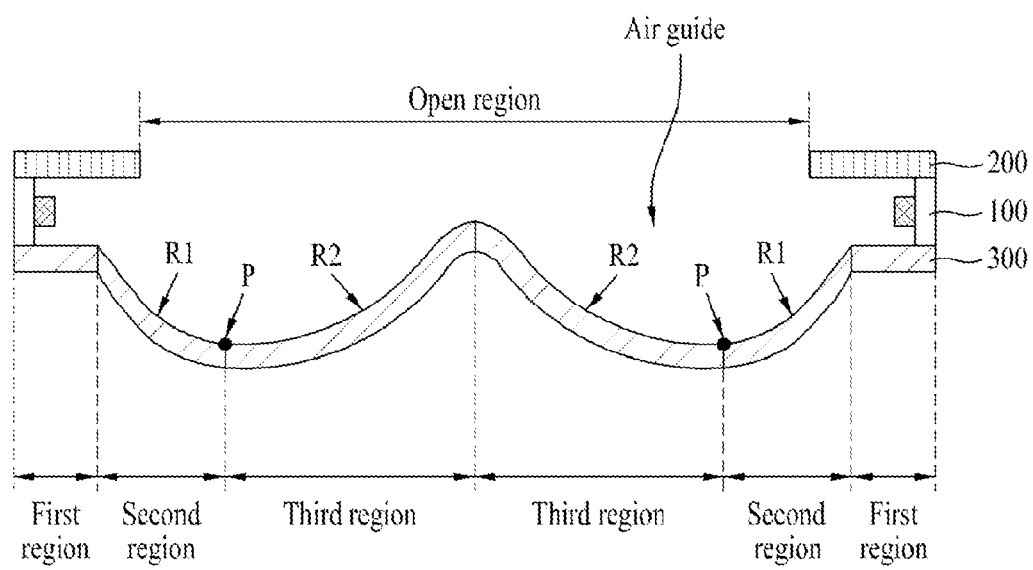
FIG. 8 is a view illustrating an inclined surface of a second reflector according to a first embodiment.

FIG. 8 is a view illustrating an inclined surface of the second reflector according to a first embodiment.

As illustrated in FIG. 8, the light source module 100 may be located between the first and second reflectors 200 and 300. The second reflector 300 may include at least one inclined surface and at least one flat surface. The flat surface of the second reflector 300 may be located close to the light source module 100 and may be parallel to the first reflector 200.

The inclined surface of the second reflector 300 may include at least one inflection point. That is, inclined surfaces, which are located next to each other about the inflection point, may have different radii of curvature.

For example, the second reflector 300 may include first, second, and third regions.

The first region may be aligned with the light source module 100 and the first reflector 200, and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface of the second region and the second inclined surface of the third region may be located next to each other about an inflection point P.

In this case, the first inclined surface of the second region may be a curved surface having a first radius of curvature R1, and the second inclined surface of the third region may be a curved surface having a second radius of curvature R2.

The first radius of curvature R1 and the second radius of curvature R2 may differ from each other, and the first radius of curvature R1 may be greater than the second radius of curvature R2.

As occasion demands, the first radius of curvature R1 and the second radius of curvature R2 may be equal to each other.

At least one of the first inclined surface of the second region and the second inclined surface of the third region may be a convexly curved surface or a concavely curved surface.

As occasion demands, the first inclined surface of the second region may be a flat surface having a first gradient and the second inclined surface of the third region may be a flat surface having a second gradient.

In this case, the first gradient and the second gradient may differ from each other, and the first gradient may be greater than the second gradient.

The first region of the second reflector 300 may be provided with a specular-reflection sheet. The second region and the third region of the second reflector 300 may be provided with at least one of a specular-reflection sheet and a diffuse-reflection sheet.

The specular-reflection sheet formed on the first region of the second reflector 300 serves to reflect light to a low luminance central region of the second reflector 300, which achieves uniform luminance.

Additionally, since the first region of the second reflector 300 is the flat surface parallel to the first reflector 200, concentrating a greater quantity of light emitted from the light source module 100 on the low-luminance central region of the second reflector 300 may increase luminance at a central region of the illumination unit.

The second reflector 300 may be formed of a metal or metal oxide having high reflectivity, such as aluminum (Al), silver (Ag), gold (Au) or titanium dioxide ($TiO_2$). The first, second and third regions of the second reflector 300 may be formed of the same material or different materials, and may have different surface roughness values.

More specifically, the first, second and third regions of the second reflector 300 may be formed of the same material, but may have different surface roughness values.

Alternatively, the first, second and third regions of the second reflector 300 may be formed of different materials and may have different surface roughness values.

Figure 9A:
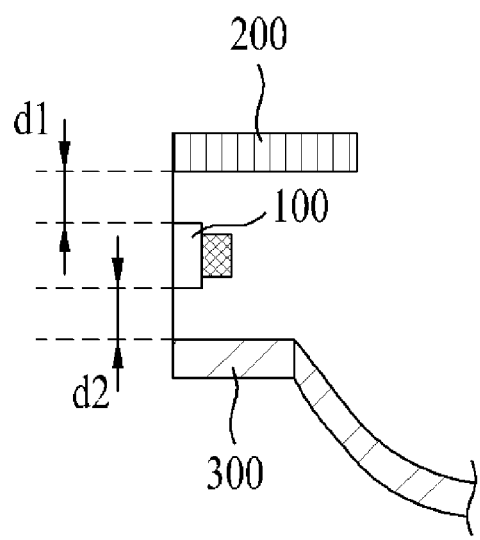
FIGS. 9A to 9C are explanatory views illustrating an arrangement relationship between a light source module and first and second reflectors.
Figure 9B:
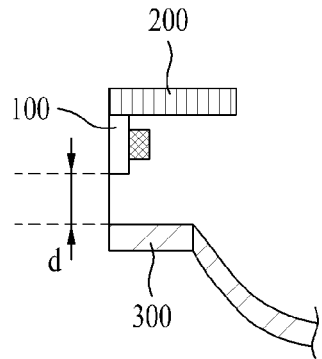
Figure 9C:
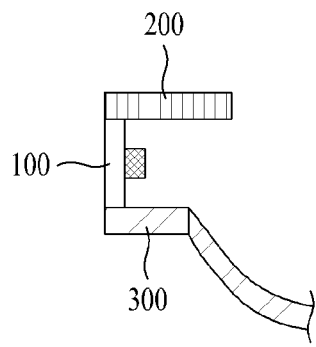

FIGS. 9A to 9C are explanatory views illustrating an arrangement relationship between the light source module and the first and second reflectors.

FIG. 9A illustrates the light source module 100 spaced apart from the first reflector 200 and the second reflector 300 by predetermined distances. FIG. 9B illustrates the light source module 100 coming into contact with the first reflector 200 while being spaced apart from the second reflector 300 by a predetermined distance. FIG. 9C illustrates the light source module 100 coming into contact with both the first reflector 200 and the second reflector 300.

As illustrated in FIG. 9A, the light source module 100 may be spaced apart from the first reflector 200 by a first distance d1 and may be spaced apart from the second reflector 300 by a second distance d2.

Here, the first distance d1 and the second distance d2 may be equal to each other, or may differ from each other.

For example, the first distance d1 may be less than the second distance d2.

This is because a hot spot phenomenon may occur if the first distance d1 is greater than the second distance d2.

As illustrated in FIG. 9B, the light source module 100 may come into contact with the first reflector 200 and may be spaced apart from the second reflector 300 by a distance d.

When the light source module 100 comes into contact with the first reflector 200, it is possible to prevent a hot spot phenomenon and to transmit light more distantly from the light source module 100.

As illustrated in FIG. 9C, the light source module 100 may come into contact with both the first reflector 200 and the second reflector 300.

When the light source module 100 comes into contact with both the first reflector 200 and the second reflector 300, it is possible to prevent a hot spot phenomenon, to transmit light more distantly from the light source module 100, and to reduce a thickness of the entire illumination unit.

Figure 10A:
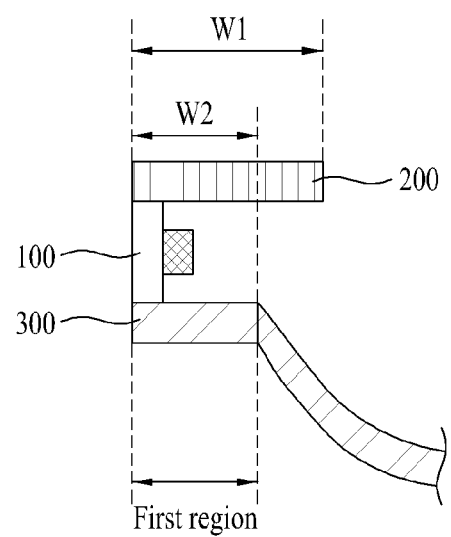
FIGS. 10A and 10B are views comparing a width of a first region of the second reflector with a width of the first reflector.
Figure 10B:
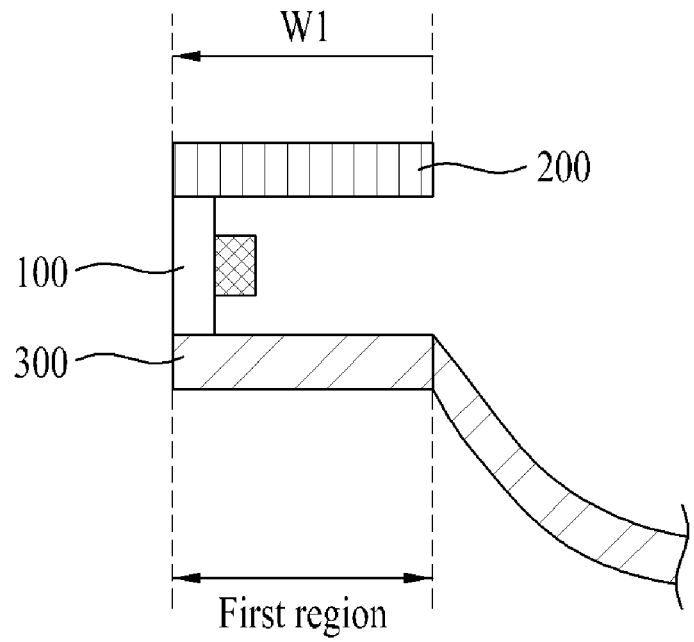

FIGS. 10A and 10B are views comparing a width of the first region of the second reflector with a width of the first reflector.

As illustrated in FIG. 10A, the first region of the second reflector 300 may overlap with the first reflector 200, and a width W2 of the first region of the second reflector 300 may be less than a width W1 of the first reflector 200.

Through this configuration, as light reflected from the first region of the second reflector 300 is repeatedly reflected from the first reflector 200, the light may be concentrated on the low luminance central region of the second reflector 300.

As illustrated in FIG. 10B, the first region of the second reflector 300 may completely overlap with the first reflector 200, and a width of the first region of the second reflector 300 may be equal to a width W1 of the first reflector 200.

FIGS. 11A to 11D are views illustrating an inclined surface of the second reflector.

Figure 11A:
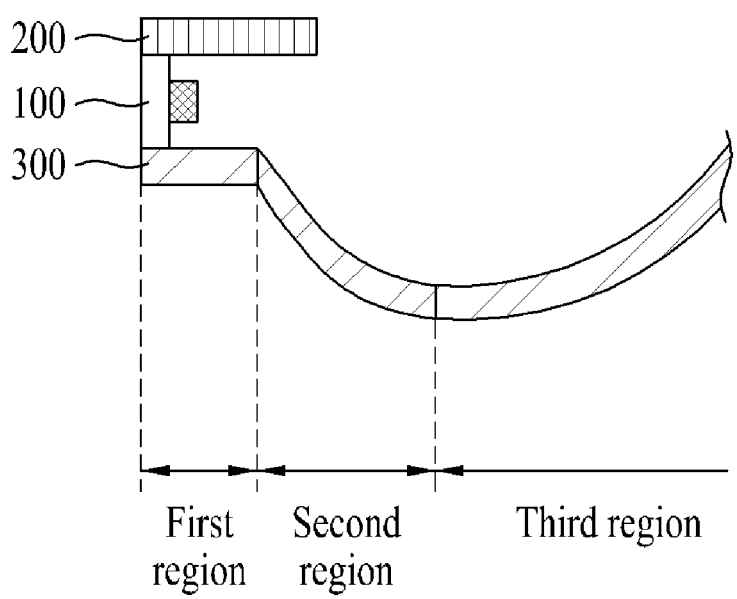
FIGS. 11A to 11D are views illustrating different inclined surfaces for the second reflector.

As illustrated in FIG. 11A, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a curved surface having a first radius of curvature, and the second inclined surface may be a curved surface having a second radius of curvature. The first radius of curvature and the second radius of curvature may differ from each other.

As occasion demands, at least one of the first and second inclined surfaces may be a convexly curved surface or a concavely curved surface.

Figure 11B:
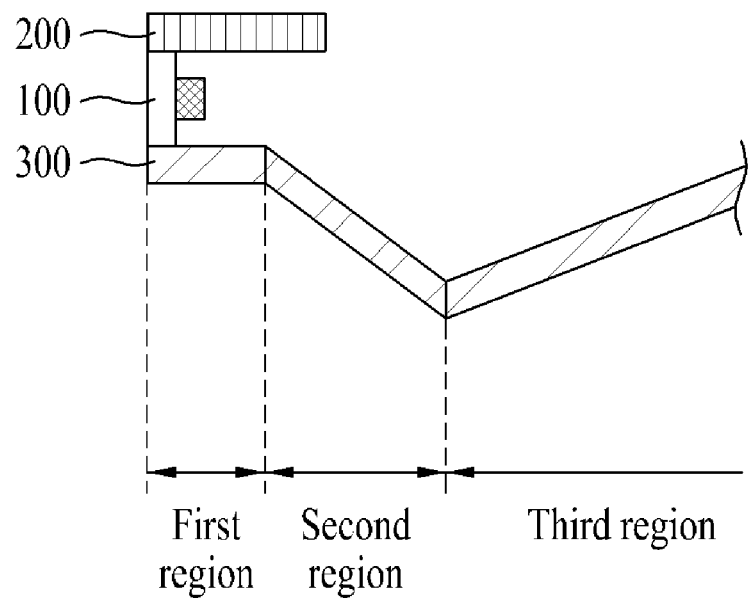

As illustrated in FIG. 11B, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a flat surface having a first gradient, and the second inclined surface may be a flat surface having a second gradient. The first gradient and the second gradient may differ from each other.

Figure 11C:
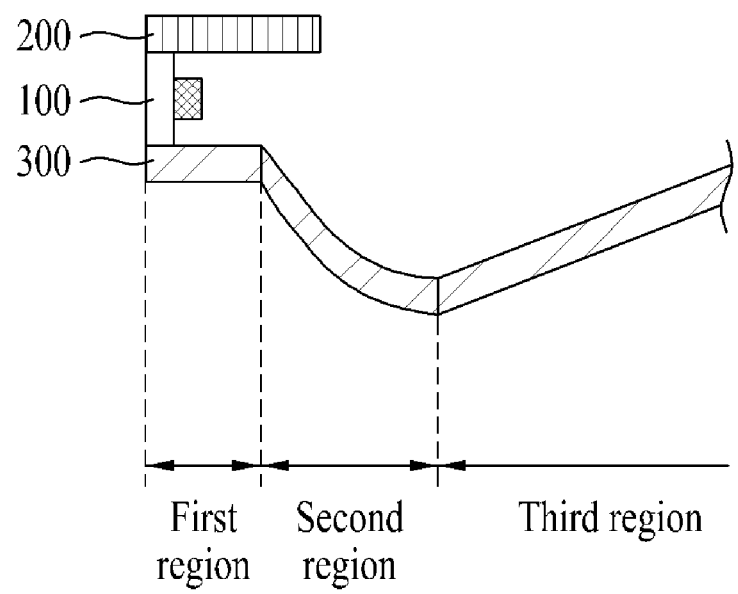

As illustrated in FIG. 11C, the second reflector 300 may include the first, second and third regions. The first region may be aligned with the light source module 100 and the first reflector 200, and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a curved surface having a predetermined radius of curvature, and the second inclined surface may be a flat surface having a predetermined gradient.

Figure 11D:
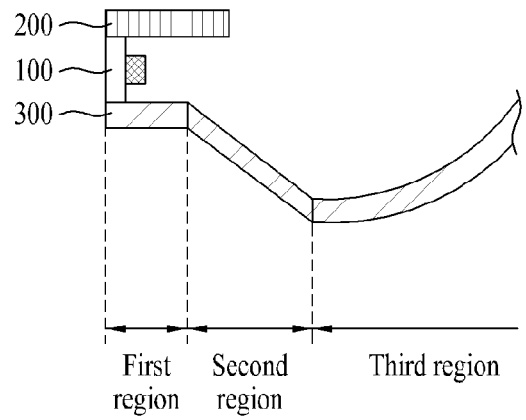

As illustrated in FIG. 11D, the second reflector 300 may include the first, second and third regions. The first region may be aligned with the light source module 100 and the first reflector 200 and may be a flat surface parallel to the first reflector 200.

The second region, which is located between the first region and the third region, may be a first inclined surface that is inclined downward from the first region. The third region, which is located next to the second region, may be a second inclined surface that is inclined upward from the second region.

The first inclined surface may be a flat surface having a predetermined gradient, and the second inclined surface may be a curved surface having a predetermined radius of curvature.

Figure 12:
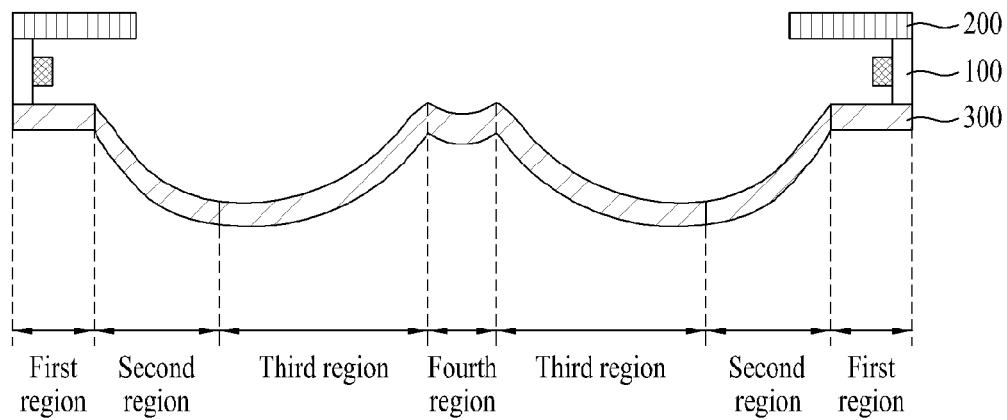
FIG. 12 is a view illustrating an inclined surface of a second reflector according to a second embodiment.

FIG. 12 is a view illustrating an inclined surface of the second reflector according to a second embodiment.

Although FIG. 12 illustrates a configuration similar to that of FIG. 8, there is a difference in that a fourth region may be additionally formed next to the third region of the second reflector 300.

As illustrated in FIG. 12, the second reflector 300 may include a center fourth region next to the third region.

The fourth region may be a flat surface parallel to the first reflector 200, or may be a curved surface having a third radius of curvature.

The fourth region is located at the center of the second reflector 300. The fourth region may have a gentle shape to provide uniform luminance because a hot spot phenomenon may occur due to light concentration if the fourth region has a sharp shape.

Figure 13A:
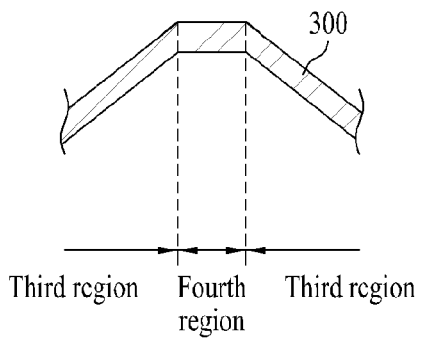
FIGS. 13A to 13C are views illustrating a fourth region of FIG. 12.
Figure 13B:
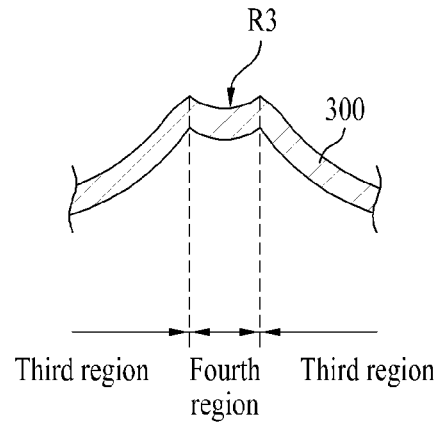
Figure 13C:
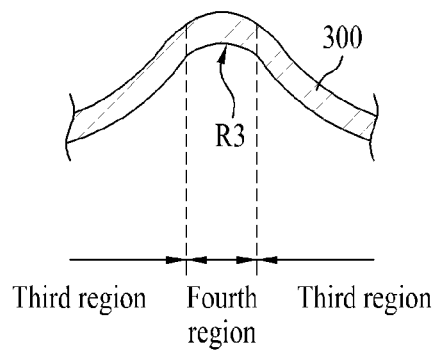

FIGS. 13A to 13C are views illustrating the fourth region of FIG. 12.

As illustrated in FIG. 13A, the fourth region of the second reflector 300 may be a flat surface parallel to the first reflector.

As illustrated in FIG. 13B, the fourth region of the second reflector 300 may be a concavely curved surface having a third radius of curvature R3. As illustrated in FIG. 13C, the fourth region of the second reflector 300 may be a convexly curved surface having a third radius of curvature R3.

As such, fabricating the fourth region with a gentle shape without a pointed portion may reduce a hot spot phenomenon and achieve uniform luminance.

The light source module 100 and the first and second reflectors 200 and 300 arranged as described above may be supported by a cover frame.

Figure 14A:
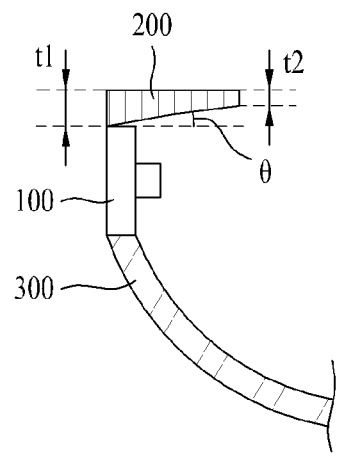
FIGS. 14A to 14D are views illustrating a first reflector having an inclined surface.
Figure 14B:
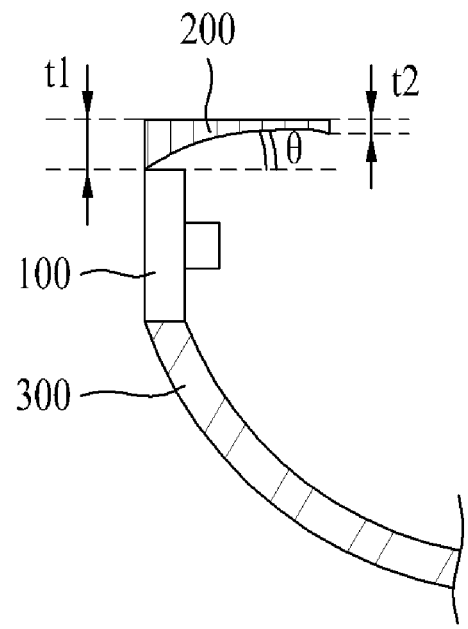
Figure 14C:
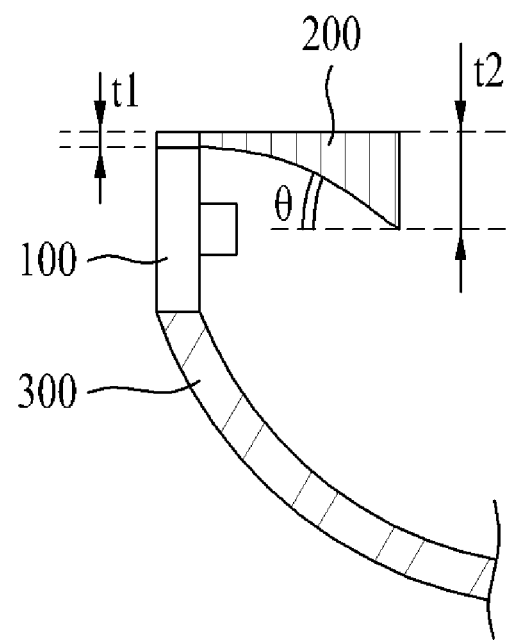
Figure 14D:
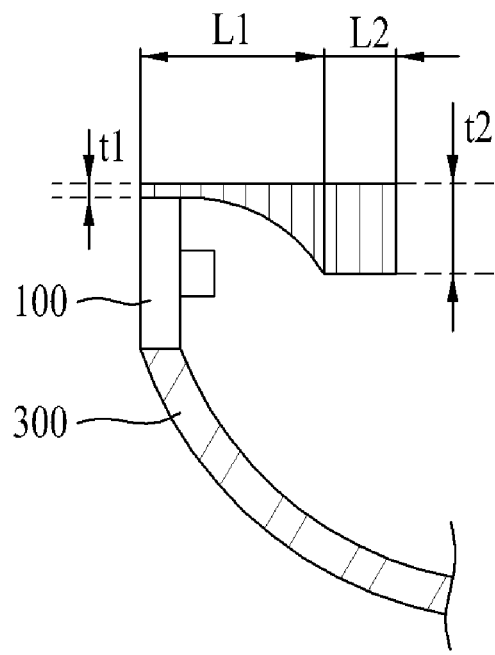

FIGS. 14A to 14D are views illustrating the first reflector having an inclined surface. FIG. 14A illustrates a flat inclined surface, and FIGS. 14B, 14C and 14D illustrate a curved inclined surface.

As illustrated in FIGS. 14A to 14D, one surface of the first reflector 200 facing the second reflector 300 may be inclined with respect to the other surface of the first reflector 200 by a predetermined angle.

Here, the angle θ of the inclined surface may be in a range of 1~85 degrees with respect to a horizontal plane parallel to the other surface of the first reflector 200.

A thickness of the first reflector 200 may gradually decrease or increase with increasing distance from the light source module 100.

More specifically, a thickness t1 of a region of the first reflector 200 close to the light source module 100 may differ from a thickness t2 of a region of the first reflector 200 distant from the light source module 100. As illustrated in FIGS. 14A and 14B, the thickness t1 of the region of the first reflector 200 close to the light source module 100 may be greater than the thickness t2 of the region of the first reflector 200 distant from the light source module 100.

As occasion demands, as illustrated in FIGS. 14C and 14D, the thickness t1 of the region of the first reflector 200 close to the light source module 100 may be less than the thickness t2 of the region of the first reflector 200 distant from the light source module 100.

Additionally, as illustrated in FIG. 14D, the first reflector 200 may include not only an inclined surface, but also a flat surface.

More specifically, the region of the first reflector 200 close to the light source module 100 may include an inclined surface, and the region of the first reflector 200 distant from the light source module 100 may include a flat surface.

Here, a length L1 of the inclined surface and a length L2 of the flat surface may be equal to each other, or may differ from each other, as occasion demands.

A reflective pattern may be formed on a surface of the first reflector 200.

FIGS. 15A to 15D are views illustrating the first reflector having a reflective pattern.

Figure 15A:
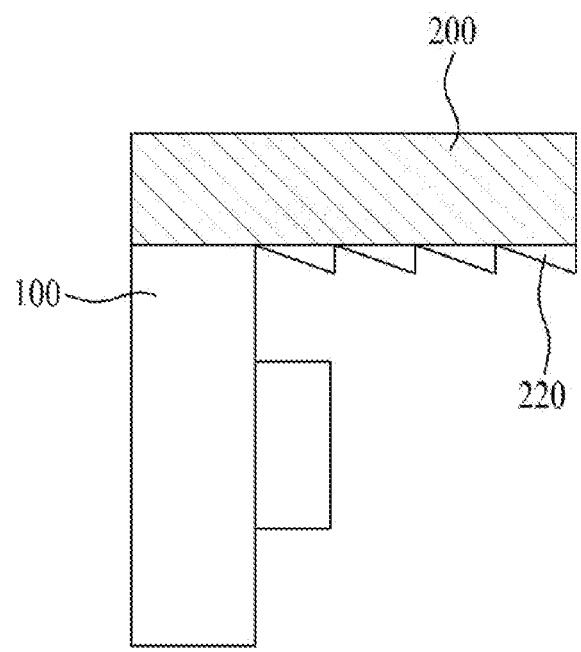
FIGS. 15A to 15D are views illustrating a first reflector having a reflective pattern.
Figure 15B:
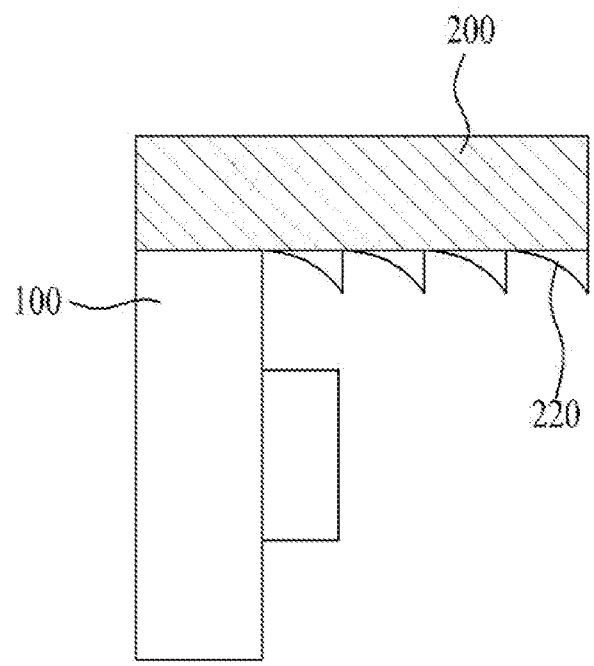
Figure 15C:
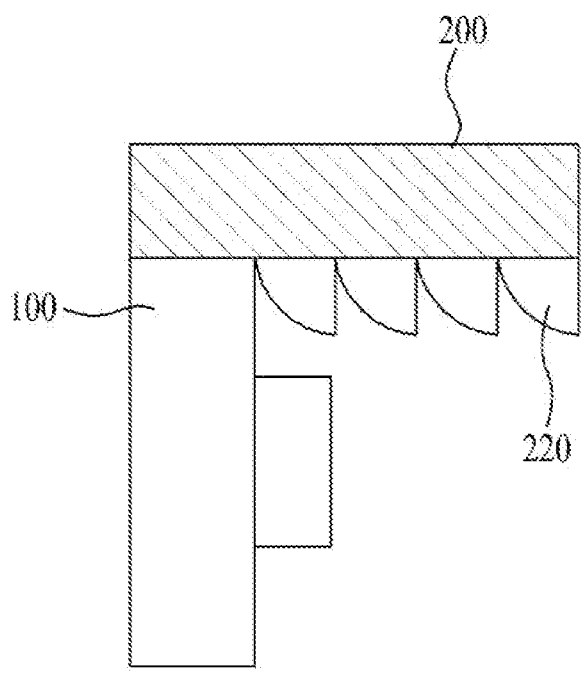

FIG. 15A illustrates a saw-toothed reflective pattern 220, each tooth of which may have a flat surface. FIGS. 15B and 15C illustrate a saw-toothed reflective pattern 220, each tooth of which may have a curved surface.

Here, the reflective pattern 220 illustrated in FIG. 15B includes saw-teeth, each having a concavely curved surface, whereas the reflective pattern 220 illustrated in FIG. 15C includes saw-teeth, each having a convexly curved surface.

Figure 15D:
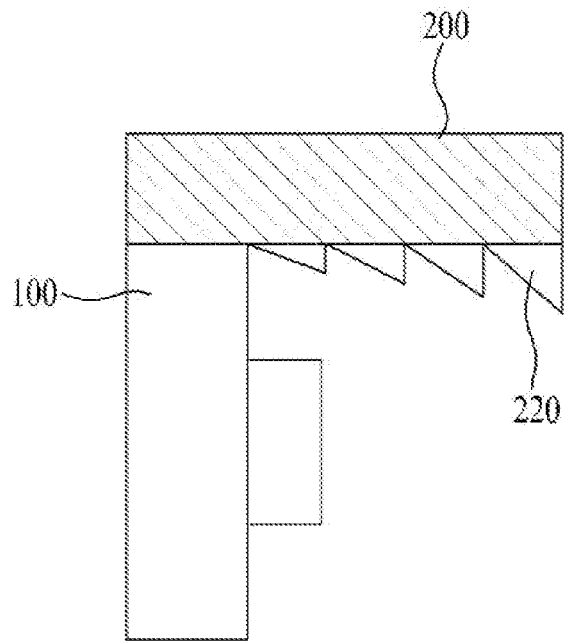

As occasion demands, as illustrated in FIG. 15D, in the case of the saw-toothed reflective pattern 220, the size of teeth may gradually increase with increasing distance from a fixed end of the first reflector 200.

The reason for providing the reflective pattern 220 on the first reflector 200 is to achieve higher reflectivity and uniform diffusion of light.

Accordingly, various sizes of the reflective pattern 220 may be formed at a corresponding region based on luminance distribution of the entire illumination unit.

Figure 16:
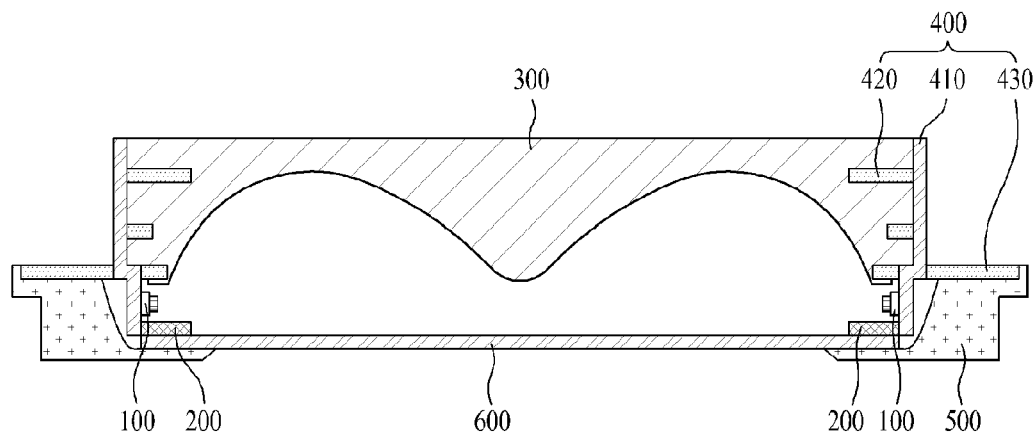
FIG. 16 is a sectional view illustrating an illumination unit including an optical member.
Figure 17:
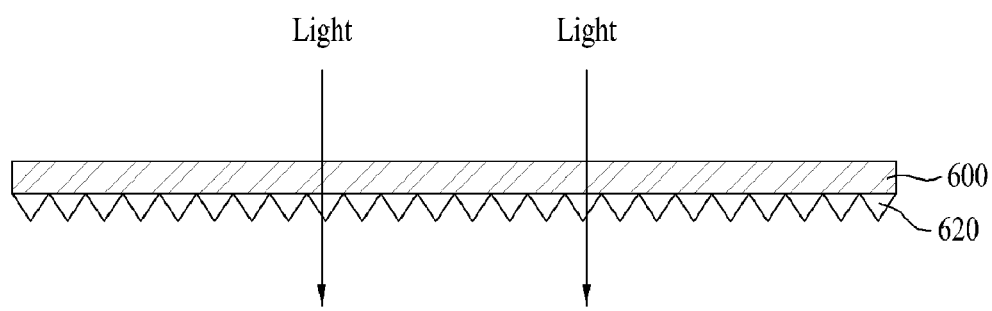
FIG. 17 is a sectional view illustrating the optical member of FIG. 16.

FIG. 16 is a sectional view illustrating an illumination unit including an optical member, and FIG. 17 is a sectional view illustrating the optical member of FIG. 16.

As illustrated in FIG. 16, the optical member 600 may be spaced from the second reflector 300 by a predetermined space.

As such, an air guide may be defined in a space between the second reflector 300 and the optical member 600.

The optical member 600, as illustrated in FIG. 17, may have a roughened pattern 620 formed on an upper surface thereof.

The optical member 600 serves to diffuse light emitted from the light source module 100. To increase diffusion effects, the roughened pattern 620 may be formed on the upper surface of the optical member 600.

More specifically, the optical member 600 may have a multilayer form. The roughened pattern 620 may be an uppermost layer or any one layer of the optical member 600.

The roughened pattern 620 may have a stripe shape extending along the light source module 100.

In this case, the roughened pattern 620 may include ridges formed on the surface of the optical member 600. The respective ridges may have a first face and a second face facing each other, and an angle between the first face and the second face may be an acute angle or an obtuse angle.

As occasion demands, the optical member 600 may be formed of at least one sheet. More specifically, the optical member 600 may selectively include a diffusion sheet, a prism sheet, a luminance-increasing sheet, or the like.

The diffusion sheet functions to diffuse light emitted from a light source, the prism sheet functions to guide diffused light to a light emitting region, and the luminance-increasing sheet functions to increase luminance.

The second reflector 300 may include at least one of a metal or a metal oxide. For example, the second reflector 300 may be formed of a metal or metal oxide having high reflectivity, such as aluminum (Al), silver (Ag), gold (Au) or titanium dioxide ($TiO_2$).

The second reflector 300 may be formed of any one of a reflective coating film and a reflective coating material layer. The second reflector 300 may serve to reflect light emitted from the light source module 100 toward the optical member 600.

A saw-toothed reflective pattern may be formed on a surface of the second reflector 300 facing the optical member 600. The reflective pattern may be flat or may be curved.

The reason for providing the surface of the second reflector 300 with the reflective pattern is to uniformly diffuse and reflect light emitted from the light source module 100.

Additionally, the bracket 400 may serve to support the light source module 100. The bracket 400 may include the body 410, and the first and second fastening members 420 and 430.

The first fastening member 420 of the bracket 400 may be fastened to the second reflector 300, and the second fastening member 430 of the bracket 400 may be fastened to the cover member 500.

As such, through provision of the bracket and the reflector having a partial inclined surface for an air guide instead of a light guide plate, the aforementioned embodiments may achieve low weight and manufacturing costs and uniform luminance.

Accordingly, the illumination unit may achieve enhanced reliability and economical efficiency and may be suitable for a wide indoor space.

In addition, a backlight unit, a display apparatus, an indicator apparatus, and an illumination system, which employ the bracket, the first and second reflectors, and the light source module according to the aforementioned embodiments, may be realized. For example, an illumination system may include a lamp, and a street lamp.

Figure 19:
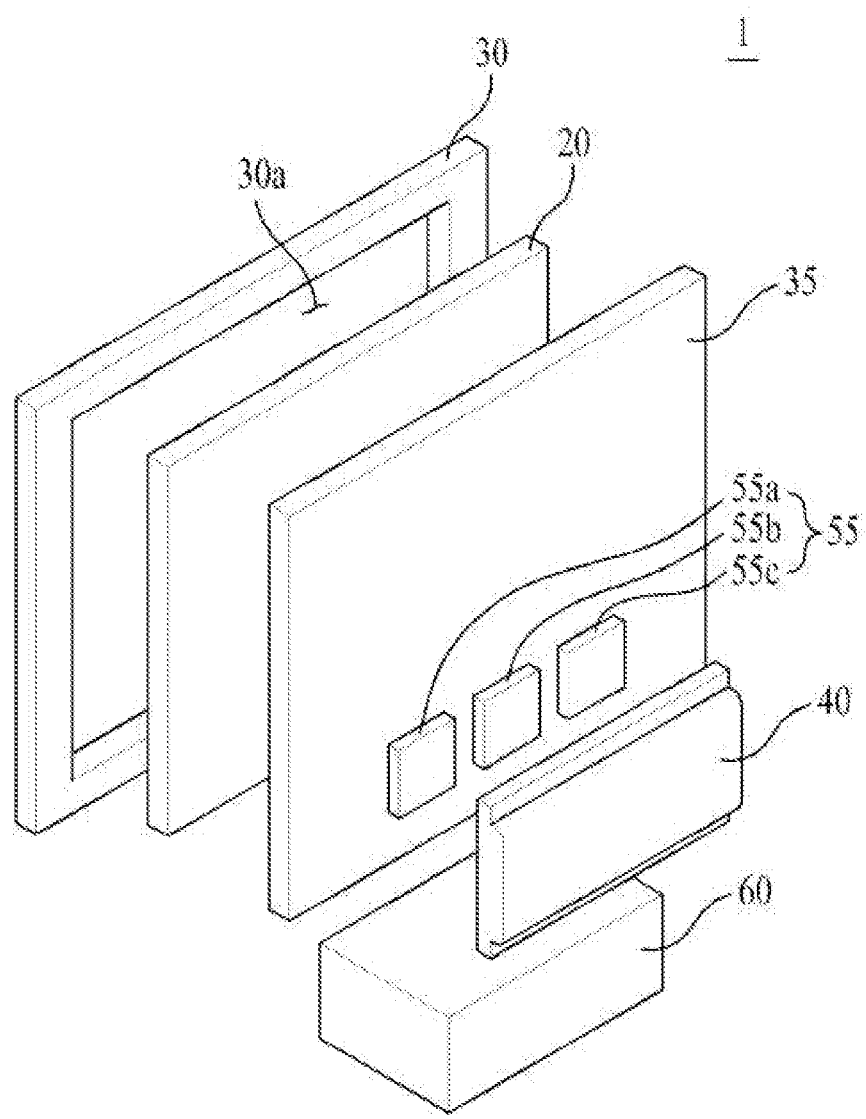
FIGS. 19 and 20 are views illustrating a display apparatus according to an embodiment.

FIG. 19 is a view illustrating a display module having an illumination unit according to an embodiment.

Figure 18:
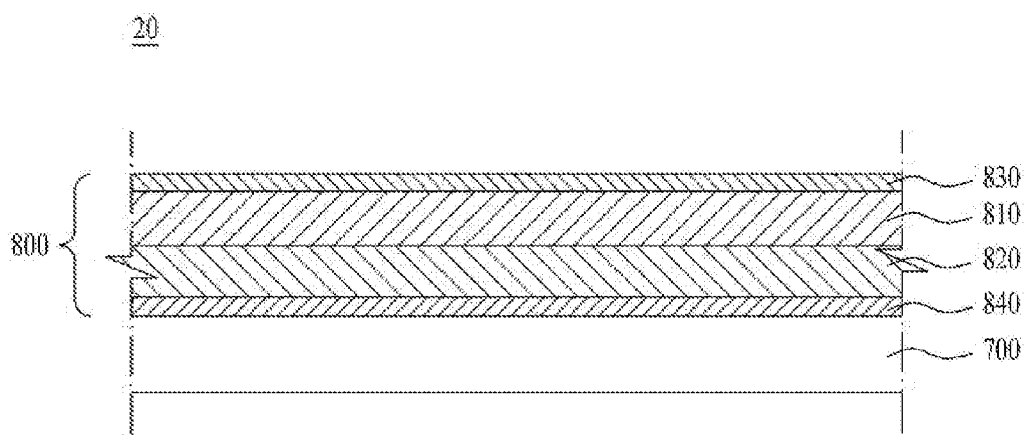
FIG. 18 is a view illustrating a display module having an illumination unit according to an embodiment.

As illustrated in FIG. 18, the display module 20 may include a display panel 800 and an illumination unit 700.

The display panel 800 may include a color filter substrate 810 and a Thin Film Transistor (TFT) substrate 820, which are bonded to face each other with a uniform cell gap therebetween. A liquid crystal layer (not shown) may be interposed between the two substrates 810 and 820.

An upper polarizer 830 and a lower polarizer 840 may be disposed at upper and lower sides of the display panel 800. More specifically, the upper polarizer 830 may be placed on an upper surface of the color filter substrate 810, and the lower polarizer 840 may be placed beneath a lower surface of the TFT substrate 820.

Although not illustrated, a gate and data drive unit may be provided at a lateral surface of the display panel 800 and may generate a drive signal to drive the panel 800.

Figure 20:
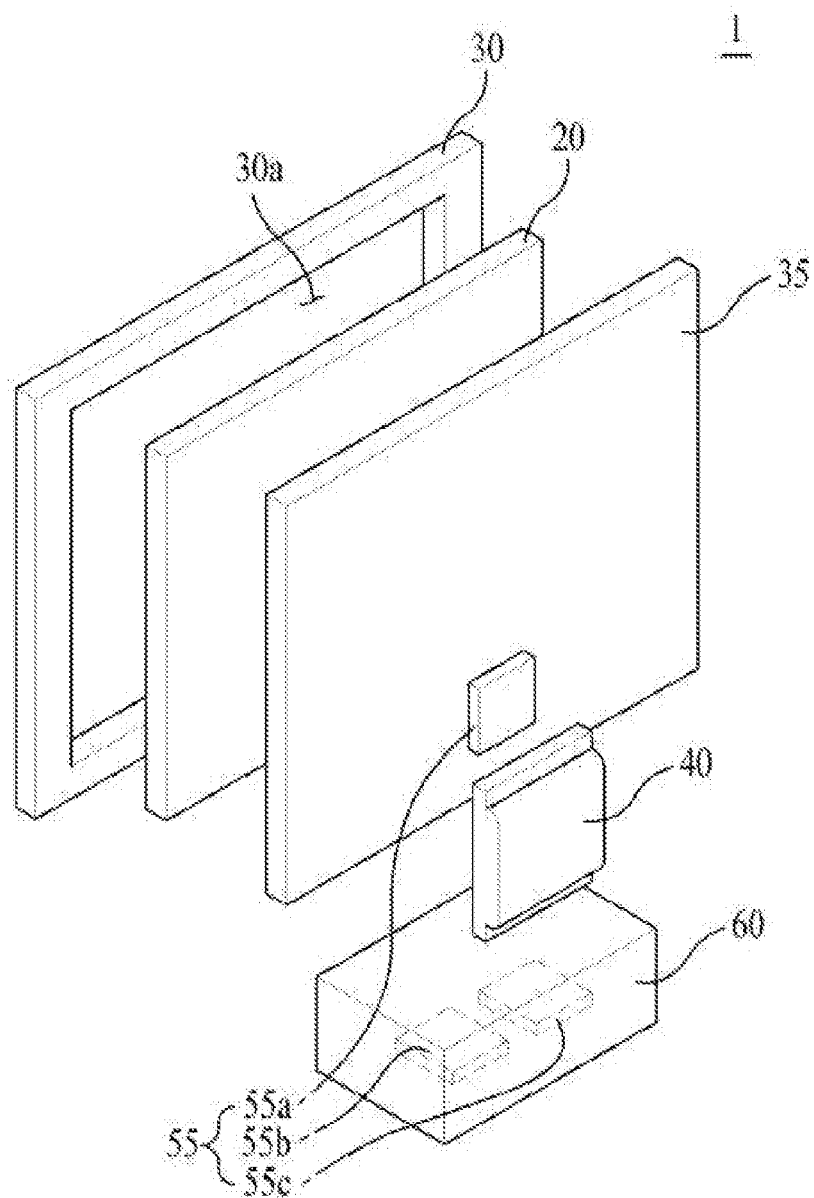

FIGS. 19 and 20 are views illustrating a display apparatus according to an embodiment.

Referring to FIG. 19, the display apparatus 1 may include the display module 20, a front cover 30 and a back cover 35 to surround the display module 20, a drive unit 55 provided at the back cover 35, and a drive unit cover 40 configured to surround the drive unit 55.

The front cover 30 may include a transparent front panel (not shown) to transmit light. The front panel serves to protect the display module 20 spaced apart therefrom by a predetermined distance and to transmit light emitted from the display module 20, allowing an image displayed on the display module 20 to be seen from the outside.

The back cover 35 may be coupled to the front cover 30 to protect the display module 20.

The drive unit 55 may be placed on a surface of the back cover 35.

The drive unit 55 may include a drive controller 55a, a main board 55b and a power supply board 55c.

The drive controller 55a may be a timing controller. The drive controller 55a serves to adjust an operation timing of each driver IC of the display module 20. The main board 55b may serve to transmit V-sync, H-sync and R, G and B resolution signals to the timing controller. The power supply board 55c supplies power to the display module 20.

The drive unit 55 may be attached to the back cover 35 and may be enclosed by the drive unit cover 40.

The back cover 35 has a plurality of holes, through which the display module 20 may be connected to the drive unit 55. Also, a stand 60 to support the display apparatus 1 may be provided.

In an alternative embodiment, as illustrated in FIG. 20, the drive controller 55a of the drive unit 55 may be provided at the back cover 35, whereas the main board 55b and the power supply board 55c may be provided in the stand 60.

The drive unit cover 40 may be configured to enclose only the drive unit 55 provided at the back cover 35.

Although the present embodiment illustrates the main board 55b and the power supply board 55c as being provided separately, they may be integrated with each other, and the disclosure is not limited thereto.

In other embodiments, a backlight unit, a display apparatus, an indicator apparatus, and an illumination system, which include the bracket, the first and second reflectors and the light source module as described in the aforementioned embodiments, may be realized. For example, the illumination system may include a lamp or a street lamp.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination unit, comprising:
   first and second reflectors;
   at least one light source module located between the first and second reflectors; and
   a bracket configured to support the light source module,
   wherein the bracket includes:
      a first segment on which the light source module is placed;
      a second segment disposed at one side of the second reflector;
      a third segment disposed between the first and second segments; and
      fastening members disposed respectively at the first, second and third segments.

2. An illumination unit comprising:
   first and second reflectors;
   at least one light source module located between the first and second reflectors; and
   a bracket configured to support the light source module,
   wherein the first and second reflectors reflect light generated from the at least one light source module, and
   wherein the bracket includes:
      a body configured to connect one side of the first reflector to one side of the second reflector;
      a first fastening member protruding from an inner surface of the body and extended to an inside of the second reflector; and
      a second fastening member protruding from an outer surface of the body.

3. The illumination unit according to claim 2, wherein the body of the bracket is arranged in a direction orthogonal to the first reflector.

4. The illumination unit according to claim 2, wherein the first fastening member protrudes orthogonally from the inner surface of the body toward the second reflector.

5. The illumination unit according to claim 2, wherein the first fastening member includes a plurality of protrusions spaced apart from one another by a predetermined distance, and a height of one of the protrusions close to the light source module is less than a height of one of the protrusions distant from the light source module.

6. The illumination unit according to claim 2, wherein the second fastening member protrudes orthogonally from the outer surface of the body in an opposite direction of the second reflector.

7. The illumination unit according to claim 2, wherein the second fastening member has at least one fastening hole.

8. The illumination unit according to claim 2, wherein a length of the second fastening member is greater than a length of the first reflector.

9. The illumination unit according to claim 2, wherein one surface of the second fastening member comes into contact with a cover member, and the cover member is spaced apart from the first reflector and is configured to cover the first reflector.

10. The illumination unit according to claim 9, wherein an optical member is located between the cover member and the first reflector.

11. The illumination unit according to claim 9, wherein a length of the cover member is greater than a total length of the first reflector and the second fastening member.

12. The illumination unit according to claim 2,
wherein the second reflector includes first and second inclined surfaces next to each other, and
wherein the first inclined surface close to the light source module is inclined upward, and the second inclined surface next to the first inclined surface is inclined downward.

13. The illumination unit according to claim 12, wherein any one of the first inclined surface and the second inclined surface is a curved surface.

14. The illumination unit according to claim 12, wherein any one of the first inclined surface and the second inclined surface is a flat surface.

15. The illumination unit according to claim 2, wherein the body of the bracket includes a first segment configured to come into contact with the light source module, and a second segment configured to come into contact with one side of the second reflector.

16. The illumination unit according to claim 15, wherein the first segment of the body defines a first plane and the second segment of the body defines a second plane different from the first plane.

17. The illumination unit according to claim 15, wherein the first segment of the body has a first length, the second segment of the body has a second length, and the second length is greater than the first length.

18. The illumination unit according to claim 15, wherein the body further includes a connecting portion that connects the first and second segments to each other, and the second fastening member is located at the connecting portion.

19. The illumination unit according to claim 15, wherein at least one fastening hole is formed in the second segment of the body.

20. A display apparatus comprising:
a display panel; and
an illumination unit configured to emit light to the display panel,
wherein the illumination unit includes:
first and second reflectors;
at least one light source module located between the first and second reflectors; and
a bracket configured to support the light source module,
wherein the first and second reflectors reflect light generated from the at least one light source module, and
wherein the bracket includes:
a body configured to connect one side of the first reflector to one side of the second reflector;
a first fastening member protruding from an inner surface of the body and extended to an inside of the second reflector; and
a second fastening member protruding from an outer surface of the body.

* * * * *